Patented Apr. 27, 1954

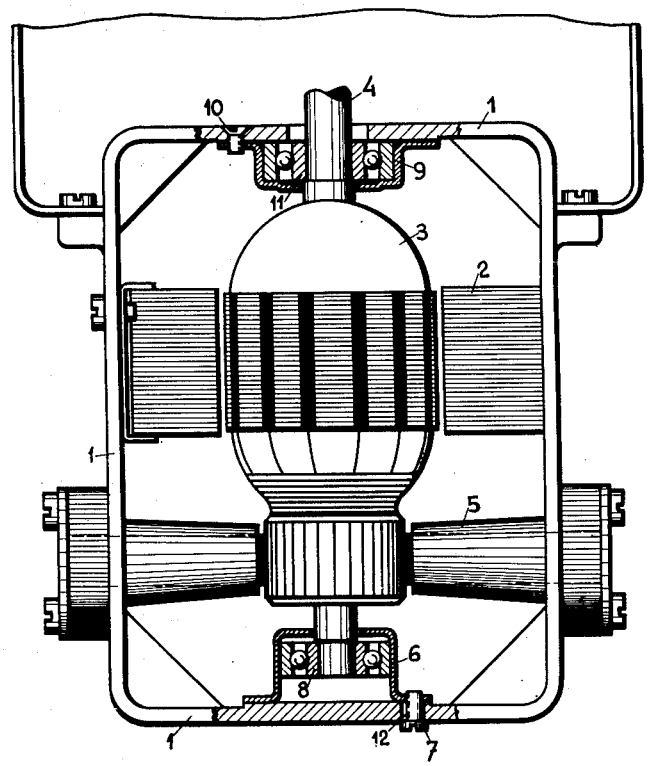

2,677,065

UNITED STATES PATENT OFFICE 2,677,065

METHOD FOR ASSEMBLING SMALL ELECTRIC MOTORS

Jan van der Heem, Voorburg, Netherlands

Application May 31, 1951, Serial No. 229,022

Claims priority, application Netherlands June 20, 1950

2 Claims. (Cl. 310—42)

Several methods for mounting small electric machines e. g. vacuum cleaner motors are known, which are directed to simplify the mounting so as to keep the costs of manufacturing as low as possible.

According to said methods in most cases one of the bearings of the rotor shaft is provided in an end shield, the second bearing being suitably adjusted in exact position in a yoke, said yoke being fixed to the end shield by means of screws or bolts. In such cases the frame of the motor consists of two parts adapted to be fixed one to another e. g. the end shield and the yoke. This construction however presents complications, which the present invention overcomes.

In the method according to the present invention when mounting the rotor shaft with the rotor provided thereon and the stator provided around the rotor with interconnection of spacers, the bearings with their covers pushed on the shaft are shifted through the open side in a unitary yoke or frame. The end of the shaft is introduced through an aperture of one end part of the yoke, after which the bearing is fixed to this yoke part by connecting the bearing cover. After connection of the stator to the upright legs of the yoke, the cover of the second bearing is connected with play to a part of the yoke. This play enables the correct adjustment of the rotor before the definite connection is made, after which the screws are set tight.

The electrical machine as preferably manufactured by the above method is characterized in that the motor body (stator and rotor) is arranged in a unitary yoke or frame. That part of the yoke opposite to the part containing the aperture for receiving the rotor shaft, is provided with holes for receiving the screws for connecting the cover of the bearing. These holes are sufficiently large so that play between the screws and the walls of the aperture gives the opportunity of adjustment in the correct position and fixing of the bearing.

In the drawing an embodiment of a motor according to the invention is shown partly in section.

The housing of the motor consists of a unitary yoke or frame having an open side to which also the housing 13 of the fan is fixed.

The yoke 1 in one of its endfaces is provided with an opening for passage of the shaft 4 of the rotor 3.

When mounting the motor according to the invention the rotor 3 with the shaft 4, provided with the bearing 11 with cover 9, and bearing 8 with cover 6 and the stator 2, arranged around the rotor 3 with spacers between rotor and stator are introduced into place from the open side of the yoke 1. Then the cover 9 of the bearing 11 is mounted by means of a number of screws 10 (e. g. three screws).

The upper part of the yoke 1 is provided with a finished surface for receiving the rim of the cover 9 in proper contacting relationship.

Thereafter the stator 2 is connected with the upright legs of the yoke 1 in any suitable way, e. g. by means of screws as shown in the drawing or by means of soldering or welding.

Finally the lower bearing 8 with its cover 6 must be fixed to the lowest part of the yoke 1, also provided with a finished surface, so that rotor and stator are mounted mutually in the correct position and in such a way that the whole arrangement is aligned exactly.

To this end according to the invention the lower part of the yoke 1 is provided with a number of openings 12 e. g. three openings, which are sufficiently large so that the screws 7 for connecting the cover 6 of the bearing 8 after loosely inserting the screws 7, allow adjusting and aligning the cover 6 with the bearing 8 exactly.

The exact alignment being obtained, the screws 7 are fixed in the exact position, after which the motor is mounted in the proper manner. After removal of the spacers arranged between rotor and stator the machine is ready.

In this way a quick and exact alignment of the rotor and stator is obtained merely by means of the exact adjustment of the cover 6, which is made possible by the fact that the openings 2 are wider than the thickness of the screws 7.

I claim:

1. In an electric motor and mount therefor, a rectangular shaped bracket frame having an open side and two short legs, one said short leg having a rotor shaft opening therethrough, a shaft bearing and a cover therefor, the shaft of said motor rotor being inserted through said bearing and said shaft opening and said bearing cover securing said bearing to said short leg, the other said short leg having holes therein, a second shaft bearing and cover therefor having screw threaded holes therein, screws passing through said holes in said other short leg and engaging in said threaded holes, said holes in said other short leg having a diameter substantially larger than the diameter of said screws whereby said bearing covering can be positionally adjusted for adjusting the position of said bearing for proper alignment of said shaft.

2. A method for mounting small electric motors in an open sided frame comprising introducing as a unit a rotor and a stator with spacers therebetween into said frame including shaft bearings and covers therefor through an open side thereof and inserting an end of the shaft of said rotor through an aperture in a leg of said frame, securing the bearing for said end of the shaft to said frame by said bearing cover, loosely connecting the bearing on the other end of said shaft of said rotor to a leg of said frame by the second said bearing cover, correctly adjusting the position of said rotor by adjusting the loosely connected cover and thereafter tightening said bearing cover to maintain correct adjustment of the rotor.

References Cited in the file of this patent

UNITED STATES PATENTS

| Number | Name | Date |
|---|---|---|
| 504,870 | Featherstone | Sept. 12, 1893 |
| 1,122,213 | Mattman | Dec. 22, 1914 |
| 1,269,750 | Saal | June 18, 1918 |
| 1,507,238 | Kocourek | Sept. 2, 1924 |